United States Patent Office 2,710,870
Patented June 14, 1955

2,710,870

PREPARATION OF CERTAIN SUBSTITUTED IMIDAZOLES

Julian K. Lawson, Jr., Morton, Pa., assignor to The Chemstrand Corporation, Decatur, Ala., a corporation of Delaware No Drawing. Application April 3, 1952,
Serial No. 280,378

5 Claims. (Cl. 260—309)

This invention relates to a group of new organic compounds and more particularly to new substituted imidazoles which are polymerizable and which, when copolymerized with polymers and copolymers containing >C=C<, produce polymeric materials having improved receptivity toward acid dyes.

According to the present invention there are provided new substituted imidazoles which may be represented by the following formula:

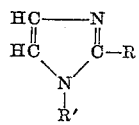

wherein R is a vinyl group or an hydroxyethyl group and R' is hydrogen or an alkyl group containing from 1 to 5 carbon atoms.

The products of the present invention, in addition to their usefulness in the production of polymeric materials, as pointed out above, are also useful as intermediates in the synthesis of products having physiological activity and possibly a source of substances having histaminic or anti-histaminic activity. The compounds of the present invention may be further employed as insecticides or plant growth hormones.

The products of the present invention may be prepared by first converting an ethylene cyanohydrin to methyl-beta-hydroxypropionimidate hydrochloride by reaction with dry methanol and dry hydrogen chloride. This reaction is represented as follows:

$$HO-CH_2CH_2-CN + CH_3OH + HCl \longrightarrow$$

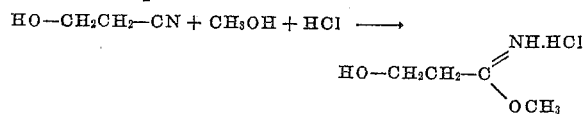

The methyl-beta-hydroxypropionimidate hydrochloride is then converted to a substituted or unsubstituted amidine hydrochloride by dissolving, with cooling, in a solution of alkylaminoacetaldehyde dimethyl acetal, wherein the alkyl group corresponds to R' in the above generic formula when it is an alkyl group, or dimethyl amino acetal in methanol. This mixture is allowed to stand for approximately 2 to 7 days or more. The amidine hydrochloride is separated by distillation of the solvent and then reacted with water and hydrochloric acid and the resultant solution evaporated to dryness. The residue is adjusted to a pH of approximately 9 to give the imidazole.

In order to produce a 2-vinyl substituted imidazole the 2-beta-hydroxyethyl derivative is first produced as outlined above and then dehydrated. Such dehydration may be accomplished by subjecting the alcohol to the action of molten potassium hydroxide, hot activated alumina, potassium bisulfate, and/or the like.

The following examples illustrate the process of the present invention and the compounds resulting therefrom. These examples are to be construed as merely illustrative and not as limiting the scope of the present invention. In the examples all parts are by weight unless otherwise indicated.

EXAMPLE I

*1-methyl-2-beta hydroxyethyl imidazole*

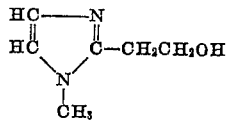

142 parts of ethylene cyanohydrin ($HOCH_2CH_2CN$) was converted to methyl-beta-hydroxypropionimidate hydrochloride by reacting it with 64 parts of dry methanol and 73 parts of dry hydrogen chloride in ether. The white solid imido ester hydrochloride thus obtained was washed thoroughly with fresh dry ether and then dissolved, with cooling, in a solution of 262 parts of methylaminoacetaldehyde dimethyl acetal (10% excess above theory) in 400 ml. of methanol. The mixture was allowed to stand at room temperature for about four days. At the end of this time the methanol and excess acetal were removed by vacuum distillation from a boiling water bath. The residue was a crude substituted amidine hydrochloride in the form of a viscous liquid.

The hydrochloride thus obtained was dissolved in 500 parts of water and added, with cooling, to 1000 parts of concentrated hydrochloric acid. The resultant aqueous solution was evaporated to dryness on a steam table and the greenish-black residue obtained thereby was brought to a pH of approximately 9 by addition of fairly concentrated potassium carbonate solution. The alkaline solution was a dark reddish brown and it in turn was evaporated as nearly as possible to dryness. The residue was extracted with 95% ethanol and filtered from inorganic salts.

The evaporation of the ethanol yielded a second residue which was extracted with isopropyl alcohol in the same fashion outlined above. The resultant isopropyl alcohol solution was concentrated by distillation, and the residue distilled at 1 to 2 mm. pressure to give 195.5 parts of a dark distillate boiling at 110° to 145° C. Upon redistillation at 0.2—0.3 mm. pressure there was obtained a light yellow distillate boiling at 85° to 105° C. This distillate solidified readily and after two recrystallizations from about 225 parts of benzene, 165 parts of 1-methyl-2-beta-hydroxyethyl imidazole, a white solid melting of 68.5°–69.5° C., were obtained which was a yield of 65.5%. The product gave an infra-red spectrogram compatible with the proposed structure.

Analysis:
  Calculated for $C_6H_{10}N_2O$—
    C, 57.2% H, 7.94% N, 22.2%
  Found—
    C, 56.96% H, 8.02% N, 22.22%
       56.92%    8.02%     22.41%

While the exact mechanism of the formation of 1-methyl-2-beta-hydroxyethyl imidazole is not known, it is believed that it may be represented somewhat as follows:

(a)

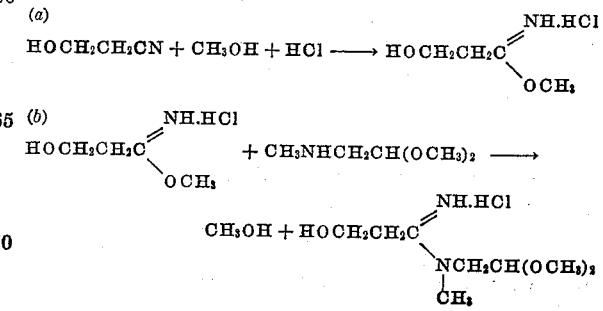

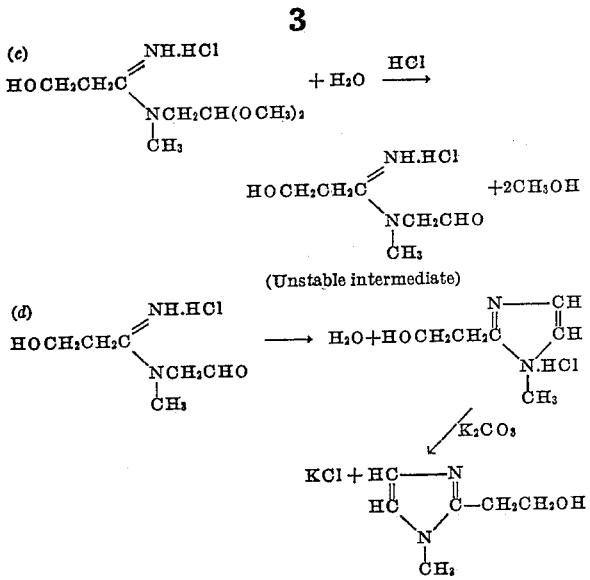

EXAMPLE II

*1-methyl-2-vinyl imidazole*

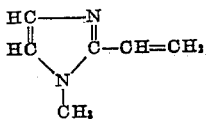

1-methyl-2-vinyl imidazole was produced by dehydrating 1-methyl-2-beta hydroxyethyl imidazole. A copper vessel was employed fitted with a rubber stopper bearing a dropping funnel and a large bore connection to a distilling system. The vessel was filled approximately half full with potassium hydroxide (400 parts) and the lower end of the dropping funnel was attached to a section of copper tubing which led well below the surface of the potassium hydroxide. The system was evacuated to about 14 mm. pressure and a capillary stream of nitrogen was drawn in through a side-arm attached to the stem of the dropping funnel. The vessel was placed in an oil bath maintained at a temperature of 180° C. When all the potassium hydroxide had melted, 63 parts of molten 1-methyl-2-beta hydroxyethyl imidazole, prepared as outlined in Example I, was added thereto from the dropping funnel, over a period of approximately two hours. The product was collected as a liquid distillate, which was twice redistilled under about 2 mm. pressure to give 40.5 parts (75% yield) of 1-methyl-2-vinylimidazole. The product had a B. P. of 75° to 77° C. at 2 mm. pressure and a refractive index of 1.5520 at 25° C. The proposed structure was confirmed by infra-red spectroscopic examination.

Analysis:
Calculated for C₆H₈H₂—N, 25.9%
Found—N, 25,47%; 25.40%

EXAMPLE III

*2-beta-hydroxyethyl imidazole*

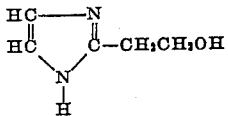

Methyl-beta-hydroxypropionimidate hydrochloride was prepared from 71 parts of ethylene cyanohydrin by the action of 32 parts anhydrous methanol and 37 parts hydrogen chloride gas in 125 parts of dry ether. The white solid obtained was washed with dry ether and then dissolved with cooling in a mixture of 200 parts methanol and 115 parts dimethyl amino acetal (NH₂CH₂CH(OCH₃)₂)

The resultant mixture was allowed to stand at room temperature for approximately one week at the end of which time excess amino acetal and methanol were removed by vacuum distillation from a hot water bath.

The residue from the vacuum distillation was dissolved in 250 parts of water and added to 500 parts of concentrated hydrochloric acid. The solution thus obtained was evaporated to near dryness over steam. The residue was mixed with strong potassium carbonate solution until the mixture was at a pH of approximately 9. The resultant reddish-black solution was again evaporated to near dryness and the residue extracted thoroughly with absolute ethanol and filtered to remove insoluble salts. The filtrate was then evaporated and the residue taken up in isopropyl alcohol. The isopropyl alcohol solution was filtered from traces of salts and then evaporated to as dry a state as possible. The crude product was isolated from the semi-solid residue by high vacuum sublimation at a bath temperature of 100°–125° C. and 0.02–0.10 mm. pressure. The product obtained was resublimed to give 56 parts of almost pure white material, which in turn was crystallized from a mixture of one volume of isopropyl alcohol and four volumes of acetone to give 45 parts of pure, white solid 2-beta-hydroxyethyl imidazole, melting at 127° to 129° C. The product was soluble in water and lower alcohols, difficultly soluble in hot acetone, and insoluble in benzene, ether, chloroform, xylene, petroleum ether and kerosene. The infra-red spectrum of the 2-beta-hydroxyethyl imidazole was compatible with its assigned structure.

Analysis:
Calculated for C₅H₈ON₂—
C, 53.6%; H, 7.14%; N, 25.0%
Found—
C, 53.92%; H, 7.23%; N, 24.82%
53.96%    7.17%    24.87%

EXAMPLE IV

*2-vinyl imidazole*

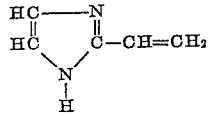

2-vinyl imidazole was produced by dehydrating 2-beta-hydroxyethyl imidazole employing potassium bisulfate as a catalyst.

15 parts of 2-beta-hydroxyethyl imidazole was mixed with 0.75 part of potassium bisulfate and the resultant mixture was placed in a glass vessel which could be heated under vacuum. The vessel was provided with a condenser of the "finger" type inserted to a point only a short distance above the mixture or charge. The apparatus was then evacuated to a pressure of 20 mm. and warm water (approximately 50° C.) was circulated through the condenser.

The apparatus was then placed in an oil bath at a temperature of about 180°–200° C. The bath was gradually heated to a maximum temperature of 280° C. in a period of about 1 hour. A product began to collect on the condenser at a bath temperature of 220°–240° C. The reaction was stopped when the undistilled charge was almost entirely converted to a viscous yellowish polymer. The product which collected on the condenser contained 4 parts of a white solid. The product was treated with 100 parts of hot benzene to dissolve out the white solid. The solution was filtered from undissolved solid, and the solute was precipitated by the addition of about 200 parts of hexane. The product separated as an oil which quickly crystallized. About 3 parts were so obtained which were sublimed under high vacuum and recrystallized from a mixture of benzene-hexane to give 1.5 parts (11.9%) of pure 2-vinylimidazole.

2-vinylimidazole is a white crystalline solid, melting at 127°–129° C. Mixed melting points with the parent alcohol, which has about the same melting point, give large depressions, a value of 85–90° C. being found for a mixture of approximately equal parts.

The infra-red spectrogram of the material so prepared was taken and found to conform to the assigned structure.

Analysis:
  Calculated for $C_5H_6N_2$—
    N, 29.77%
  Found—
    N, 29.29%
       29.48%

2-vinylimidazole is soluble in water, alcohols, acetone, methyl ethyl ketone, esters and chloroform. It is moderately soluble in benzene or toluene, and essentially insoluble in hexane or heptane.

2-vinyl imidazole polymerizes readily under certain conditions, especially when catalyzed by added substances capable of yielding free radicals. However, it has been found occasionally to polymerize when heated in solution in solvents which often contain traces of peroxides such as acetone or isopropanol.

EXAMPLE V

*1-propyl-2-vinylimidazole*

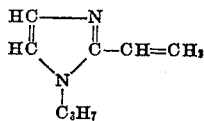

1-propyl-2-beta-hydroxyethyl imidazole is first prepared by following the procedure outlined in Example I with the exception that propylaminoacetaldehyde dimethyl acetal is employed. The resultant alcohol is dehydrated with potassium hydroxide as outlined in Example II to give 1-propyl-2-vinyl-imidazole.

The 1-ethyl, butyl and amyl derivatives of 2-vinyl-imidazoles may likewise be synthesized using the same general procedure outlined in Examples I and II by employing the ethyl-, butyl- and amyl-aminoacetaldehyde dimethyl acetals in place of the methylaminoacetaldehyde dimethyl acetal of Example I. All of these compounds are readily polymerizable using conventional polymerization procedures.

The products of the present invention may be copolymerized with polymers and copolymers containing the ethylenic (>CH=CH<) linkage to produce polymeric materials having improved receptivity toward acid dyes. For example, polymers and copolymers comprising acrylonitrile, acids such as acrylic, haloacrylic and methacrylic acid, esters such as methyl methacrylate, butyl, octyl, methoxymethyl, and chlorethyl methacrylate and the corresponding esters of acrylic and alpha-chloracrylic acids; methacrylonitrile, vinyl and vinylidene halides such as vinyl chloride, vinyl fluoride, vinylidene chloride, vinylidene fluoride, 1-fluoro-1-chlorethylene; vinyl carboxylates such as vinyl acetate, vinyl chloroacetate, vinyl propionate, and vinyl stearate; N-vinyl-imides such as N-vinylphthalimide and N-vinyl succinimide; N-vinyl lactams such as N-vinylcaprolactam and N-vinyl butyrolactam; vinyl aryl compounds such as styrene and vinyl naphthalene; and other compounds such as methyl vinyl ketone, chlortrifluoroethylene, methyl fumarate, methyl vinyl sulfone, methyl vinyl sulfoxide, methyl vinyl sulfide, fumaronitrile, and maleic anhydride, may be employed.

It is to be understood that changes and variations may be made without departing from the spirit and scope of the present invention as defined in the appended claims.

I claim:

1. A process for preparing compounds of the formula type:

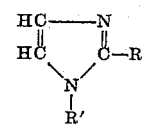

wherein R is selected from the group consisting of vinyl and hydroxyethyl, and R' is selected from the group consisting of hydrogen and alkyl radicals containing from 1 to 5 carbon atoms, said process comprising the steps of converting ethylene cyanohydrin to methyl-beta-hydroxy-propionimidate hydrochloride by reacting ethylene cyanohydrin with dry methanol and dry hydrogen chloride, reacting the product with a compound selected from the group consisting of alkylaminoacetaldehyde dimethyl acetal and dimethylamino acetal, reacting the compound with water and hydrochloric acid, evaporating the resultant solution, adjusting the residue to a pH of approximately 9, and then dehydrating the residue.

2. The process defined in claim 1 wherein the residue is dehydrated by reaction with molten potassium hydroxide.

3. The process defined in claim 1 wherein the residue is dehydrated by heating it under vacuum in contact with potassium bisulfate.

4. A process for preparing 1-methyl-2-beta hydroxyethyl imidazole comprising the steps of reacting ethylene cyanohydrin with dry methanol and dry hydrogen chloride, dissolving the reaction product in a solution of methylaminoacetaldehyde dimethyl acetal in methanol, allowing the solution to stand at room temperature for about 1 to 7 days, distilling the solution, reacting the residue with water and hydrochloric acid, evaporating the resultant solution, and then adjusting the residue to a pH of approximately 9.

5. A process for producing 1-methyl-2-vinyl imidazole as defined in claim 11 wherein the residue after being adjusted to a pH of approximately 9 is dehydrated by reacting it with molten potassium hydroxide.

References Cited in the file of this patent

UNITED STATES PATENTS

| | | |
|---|---|---|
| 2,056,449 | Graenacker | Oct. 6, 1936 |
| 2,226,057 | Graenacker | Dec. 24, 1940 |
| 2,606,175 | Price | Aug. 5, 1952 |

FOREIGN PATENTS

| | | |
|---|---|---|
| 708,262 | Germany | July 16, 1941 |

OTHER REFERENCES

Jones, JACS, vol. 71, pp. 383–86, February 1949.

Chemical Abstract, index to vol. 42, 1948, pp. 10169–70.